(12) United States Patent
Speier (10) Patent No.: US 10,372,635 B2
(45) Date of Patent: Aug. 6, 2019

(54) DYNAMICALLY DETERMINING MEMORY ATTRIBUTES IN PROCESSOR-BASED SYSTEMS

(71) Applicant: QUALCOMM Incorporated, San Diego, CA (US)

(72) Inventor: Thomas Philip Speier, Wake Forest, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/637,290

(22) Filed: Jun. 29, 2017

(65) Prior Publication Data

US 2018/0060255 A1  Mar. 1, 2018

Related U.S. Application Data (60) Provisional application No. 62/379,952, filed on Aug. 26, 2016.

(51) Int. Cl.
*G06F 12/00* (2006.01)
*G06F 13/16* (2006.01)
(Continued)

(52) U.S. Cl.
CPC ............ *G06F 13/161* (2013.01); *G06F 3/061* (2013.01); *G06F 3/0619* (2013.01);
(Continued)

(58) Field of Classification Search
None
See application file for complete search history.

(56) References Cited

U.S. PATENT DOCUMENTS 6,804,760 B2   10/2004   Wiliams
7,506,103 B2   3/2009    Madter
(Continued)

FOREIGN PATENT DOCUMENTS

WO       2014149860 A1       9/2014

OTHER PUBLICATIONS

Intel Extreme Memory Profile DDR3 Technology White Paper, Jan. 2009 (Year: 2009).*
(Continued)

*Primary Examiner* — Jason W Blust
(74) *Attorney, Agent, or Firm* — Withrow & Terranova, PLLC (57) ABSTRACT

Providing dynamic determination of memory attributes in processor-based systems is disclosed. In this regard, in some aspects, a processor-based system comprises a processor device and one or more memory devices, each of which is associated with one of a plurality of memory attributes. The processor device transmits a request to one of the memory devices to determine the memory attribute associated with the memory device. In response to the request, the memory device provides a memory attribute indication that informs the processor device of the memory attribute associated with the memory device. The processor device in some aspects then performs subsequent memory access operations on the memory device based on the memory attribute indication. Some aspects may provide that the processor device also stores the memory attribute indication, and performs subsequent memory access operations based on the stored memory attribute indication.

16 Claims, 6 Drawing Sheets

(51) Int. Cl.
　　*G06F 3/06*　　　(2006.01)
　　*G06F 9/50*　　　(2006.01)
　　*G06F 12/02*　　　(2006.01)
　　*G06F 12/06*　　　(2006.01)
　　*G06F 12/0804*　　(2016.01)

(52) U.S. Cl.
　　CPC .......... *G06F 9/5016* (2013.01); *G06F 12/023* (2013.01); *G06F 12/0223* (2013.01); *G06F 12/06* (2013.01); *G06F 12/0638* (2013.01); *G06F 13/1673* (2013.01); *G06F 12/0804* (2013.01)

(56) References Cited

U.S. PATENT DOCUMENTS

| | | | |
|---|---|---|---|
| 8,595,463 | B2 | 11/2013 | Tremaine et al. |
| 2007/0185902 | A1 | 8/2007 | Messinger et al. |
| 2008/0111586 | A1 | 5/2008 | Kuo et al. |
| 2014/0164720 | A1 | 6/2014 | Stewart et al. |
| 2014/0223098 | A1* | 8/2014 | Lee ................ G06F 9/5016 711/118 |

OTHER PUBLICATIONS

Intel Extreme Memory Profile (XMP) specification rev 1.1, Oct. 2007 (Year: 2007).*
PC SDRAM Serial Presence Detect (SPD) Specification, rev 1.2B, Intel, Nov. 1999 (Year: 1999).*
Soltysiak, Maciej, "Using dmidecode to find out what memory chips you have," Linux + Administrator = Linuxator, Linux Administrator's blog, Oct. 28, 2008, 10 pages, retrieved from the internet: https://linuxator.wordpress.com/2008/10/28/using-dmidecode-to-find-out-what-memory-chips-you-have/.
International Search Report and Written Opinion for PCT/US2017/043903, dated Oct. 11, 2017, 18 pages.
Second Written Opinion for PCT/US2017/043903, dated Jul. 18, 2018, 8 pages.

* cited by examiner

DYNAMICALLY DETERMINING MEMORY ATTRIBUTES IN PROCESSOR-BASED SYSTEMS

PRIORITY CLAIM

The present application claims priority to U.S. Provisional Patent Application Ser. No. 62/379,952 filed on Aug. 26, 2016 and entitled "DYNAMICALLY DETERMINING ARCHITECTURAL MEMORY TYPES IN PROCESSOR-BASED SYSTEMS," the contents of which is incorporated herein by reference in its entirety.

BACKGROUND

I. Field of the Disclosure

The technology of the disclosure relates generally to memory controllers for processor-based systems, and, in particular, to management of memory having different memory attributes.

II. Background

Memory devices employed by conventional computer processor architectures may be categorized according to a number of memory attributes. For instance, system memory can be categorized based on an architectural memory type indicating whether the memory may be considered "normal" or "device" memory. As used herein, "normal" memory guarantees that a data value read from a given memory location is always the data value most recently written to that memory location, with no unexpected side effects. In contrast, "device" memory does not guarantee that a data value read from memory is the most recently written data value. It is to be understood that other computer processor architectures may employ different but analogous terminology when referring to normal and device architectural memory types. In addition to architectural memory types, other memory attributes may include memory persistence, memory attachment (e.g., directly attached or attached via an external bus link), and/or memory latency, as non-limiting examples.

The memory attributes of memory devices that make up a given memory region may determine what operations can or cannot be performed on the memory region by computer hardware. For instance, with respect to architectural memory types, the contents of normal memory can be cached, can be speculatively read, and/or can be read and buffered with the expectation that the same data can be subsequently read again, while the contents of device memory cannot. Consequently, the computer hardware must coordinate with any executing software to ensure that unexpected side effects do not occur as a result of memory operations. This coordination may include enabling software to designate the memory attributes of a memory region (e.g., a page of memory) by programming one or more page tables. The computer hardware may then determine what operations can be performed using that memory region by reading the memory attributes from the one or more page tables.

However, in many instances, the memory attributes applied to a given memory region may not accurately reflect the actual characteristics and behavior of the memory region. For instance, memory that is actually normal may nevertheless be marked as device memory (e.g., in the ARM architecture, all memory is treated as device memory at the beginning of the boot process, regardless of the actual architectural memory type). Similarly, memory may be unintentionally misclassified, as may happen when device drivers originally written for one computer architecture are ported to a different computer architecture that uses a different memory model. Memory may even be intentionally mischaracterized by software, depending on the agent accessing the memory (e.g., the memory may be indicated as normal when accessed by the CPU but indicated as device when accessed by an input/output (I/O) device).

Thus, to maintain memory coherence, a mechanism for obtaining a consistent view of memory attributes is desirable. One approach is to identify and categorize memory regions at design time, using mechanisms such as programmable registers to indicate the memory attributes. One shortcoming of this approach, though, is a lack of scalability. A solution that is capable of accounting for memory attributes of non-contiguous memory or memory that may be dynamically added and removed may require either a prohibitively large number of registers or a prohibitively large amount of design-time coding.

SUMMARY OF THE DISCLOSURE

Aspects disclosed in the detailed description include providing dynamic determination of memory attributes in processor-based systems. In this regard, in some aspects, a processor-based system for providing dynamic determination of memory attributes is provided. The processor-based system comprises a processor device and one or more memory devices, each of which is associated with one of a plurality of memory attributes. As non-limiting examples, the plurality of memory attributes may include an architectural memory type, a memory persistence type, a memory attachment type, and/or a memory latency. The processor device is configured to transmit a request to one of the memory devices to determine the memory attribute associated with the memory device. In some aspects, the request may include a memory attribute query that expressly requests the memory attributes, while some aspects may provide that the request comprises a first memory access request that is sent to the memory device by the processor device. In response to the request, the memory device is configured to provide a memory attribute indication that informs the processor device of the memory attribute associated with the memory device. The memory attribute indication may be provided by itself in response to a memory attribute query, or may be provided as part of a memory access response. The processor device in some aspects then performs subsequent memory access operations on the memory device based on the memory attribute indication. Some aspects may provide that the processor device also stores the memory attribute indication, and performs subsequent memory access operations based on the stored memory attribute indication.

In another aspect, a processor-based system for providing dynamic determination of memory attributes is provided. The processor-based system comprises a processor device and one or more memory devices each associated with a memory attribute of a plurality of memory attributes. The processor device is configured to transmit a request to a memory device of the one or more memory devices to determine a memory attribute of the memory device. The processor device is further configured to receive, from the memory device, a memory attribute indication indicating the memory attribute of the memory device.

In another aspect, a memory device associated with a specified memory attribute is provided. The memory device is configured to receive, from a processor device of a processor-based system, a request to provide a memory attribute of the memory device. The memory device is further configured to, responsive to receiving the request, provide a memory attribute indication indicating the memory attribute of the memory device to the processor device.

In another aspect, a method for providing dynamic determination of memory attributes is provided. The method comprises transmitting, by a processor device of a processor-based system, a request to a memory device of one or more memory devices of the processor-based system to determine an architectural memory attribute of the memory device. The method further comprises providing, by the memory device, a memory attribute indication indicating the memory attribute of the memory device to the processor device.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1:
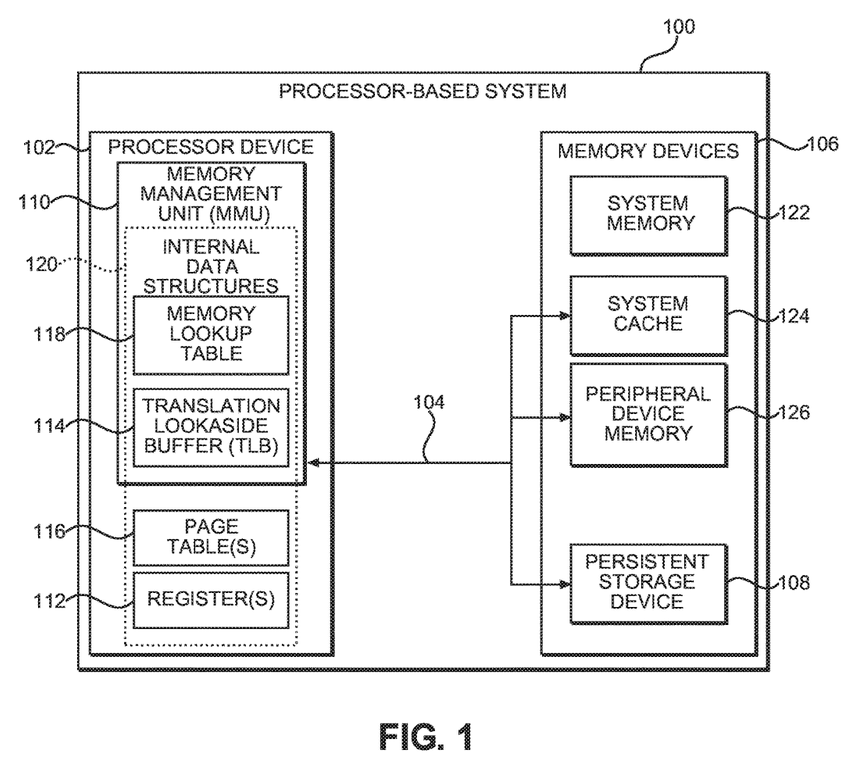
FIG. 1 is a block diagram of an exemplary processor-based system providing memory devices having different memory attributes.

Aspects disclosed in the detailed description include providing dynamic determination of memory attributes in processor-based systems. Before discussing operations for dynamic determination of memory attributes in greater detail, an exemplary processor-based system and elements thereof are described with respect to FIG. 1. In this regard, FIG. 1 is an exemplary processor-based system 100 that includes a processor device 102 that is communicatively coupled via a system interconnect 104 to memory devices 106 and a persistent storage device 108. The processor device 102 provides a memory management unit (MMU) 110 for managing access to the memory devices 106. The processor device 102 also includes one or more registers 112, which may be programmatically read from and written to by software. The persistent storage device 108 may comprise any non-volatile storage device such as a hard disk drive (HDD), a solid state drive (SSD), or the like.

The MMU 110 provides a translation lookaside buffer (TLB) 114 for caching recently used virtual-to-physical memory address translations, and one or more page tables 116 for storing mappings between virtual memory addresses and physical memory addresses. As seen in FIG. 1, the MMU 110 is also communicatively coupled to the persistent storage device 108 via the system interconnect 104. In this manner, the MMU 110 may use the persistent storage device 108 as a backing store to which pages of memory may be moved from physical memory. The MMU 110 in some aspects may also provide a memory lookup table 118 for caching precalculated values for later use. Collectively, the TLB 114 and the memory lookup table 118 are referred to herein as "internal data structures 120."

The memory devices 106 illustrated in FIG. 1 may include a system memory 122, a system cache 124, and a peripheral device memory 126, as non-limiting examples. The system memory 122 in some aspects may comprise double data rate (DDR) synchronous dynamic random access memory (SDRAM), as a non-limiting example. The system cache 124 according to some aspects may comprise a Level 1 (L1), Level 2 (L2), or Level 3 (L3) cache, as non-limiting examples. The peripheral device memory 126 may be provided as part of a peripheral device (not shown) such as an Express Peripheral Component Interface (PCI-e) device, as a non-limiting example. As used herein, the system memory 122, the system cache 124, and the peripheral device memory 126 may each be referred to generally as a "memory device 122," a "memory device 124," and a "memory device 126," respectively. The memory devices 106 according to some aspects may include other elements in addition to those shown in FIG. 1.

The processor-based system 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based system 100 may include elements in addition to those illustrated in FIG. 1.

As noted above, each of the memory devices 106 in the example of FIG. 1 may be characterized according to memory attributes of the memory devices 106, such as having an architectural memory type of normal memory or device memory, as non-limiting examples. In order to maintain a coherent and consistent view of the memory attributes of each of the memory devices 106 in a scalable manner, the processor device 102, the MMU 110, and/or the memory devices 106 are configured to enable dynamic determination of memory attributes. In one aspect, when an agent such as the processor device 102 requires access to a particular memory location of one of the memory devices 106, the processor device 102 (e.g., using the MMU 110) will send a request to query that particular one of the memory devices 106 for one or more of its memory attributes. Each of the memory devices 106 is configured to be aware of its own memory attributes, and to respond to the processor device 102 accordingly. The processor device 102 will then designate the accessed region of memory as having the specified memory attribute(s), and will perform memory access operations accordingly based on the memory attribute. For example, the processor device 102 may determine that operations, such as speculative read operations or cache operations, should be allowed or disallowed for that region of memory based on the specified memory attribute provided by the particular one of the memory devices 106.

Figure 2A:
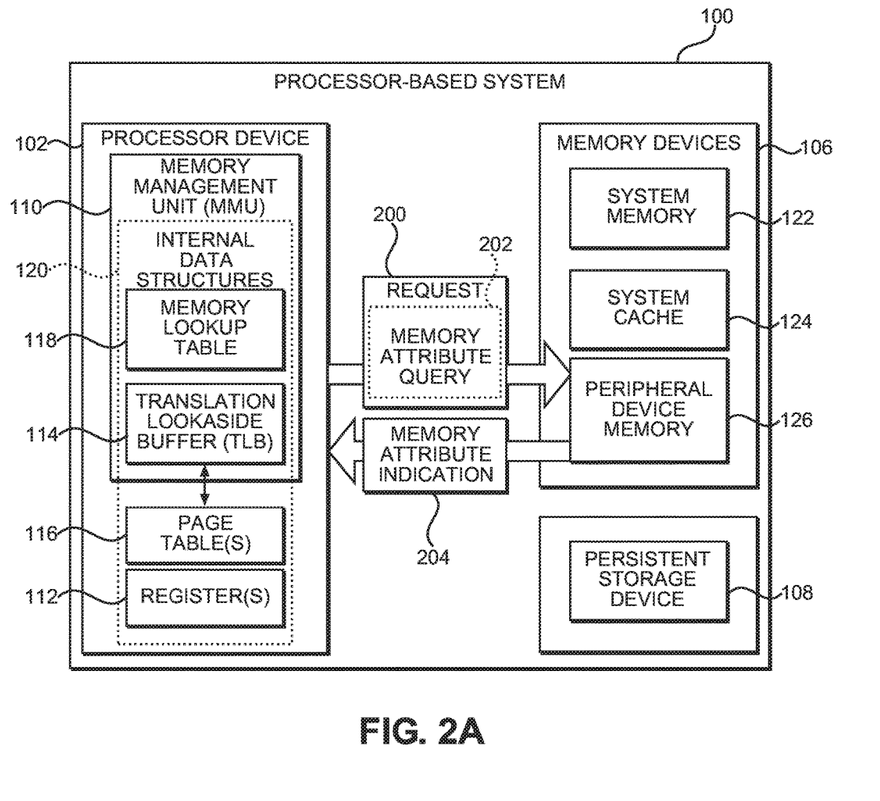
FIGS. 2A-2C are block diagrams of exemplary processor-based systems including memory controllers and memory devices configured to dynamically determine a memory attribute of each memory device.

According to some aspects, the processor device 102 may be configured to employ a dedicated instruction or command, referred to herein as a "memory attribute query," to request a memory attribute of one of the memory devices 106. In this regard, FIG. 2A illustrates an exchange between the MMU 110 of the processor device 102 and the peripheral device memory 126. It is to be understood that the communications between the MMU 110 and the peripheral device memory 126 are shown for illustrative purposes only, and that similar exchanges may take place between the MMU 110 (or other elements of the processor device 102) and the system memory 122 and/or the MMU 110 (or other elements of the processor device 102) and the system cache 124.

As seen in the example of FIG. 2A, the MMU 110 transmits a request 200 comprising a memory attribute query 202 to the peripheral device memory 126. The memory attribute query 202 represents an instruction or command defined by the underlying architecture of the processor-based system 100 for the purpose of querying the memory devices 106 for their associated memory attributes. In response to the memory attribute query 202 received as part of the request 200 from the MMU 110, the peripheral device memory 126 responds with a memory attribute indication 204. The memory attribute indication 204 comprises a pre-defined code or indicator representing one or more memory attributes associated with the peripheral device memory 126. Upon receiving the memory attribute indication 204, the MMU 110 may store the memory attribute indication 204 for the peripheral device memory 126 for later reference. In some aspects, the memory attribute indication 204 may be stored in one of the internal data structures 120, such as the TLB 114, the one or more page tables 116, the one or more registers 112, and/or in the memory lookup table 118 of the processor device 102, as non-limiting examples.

Figure 2B:
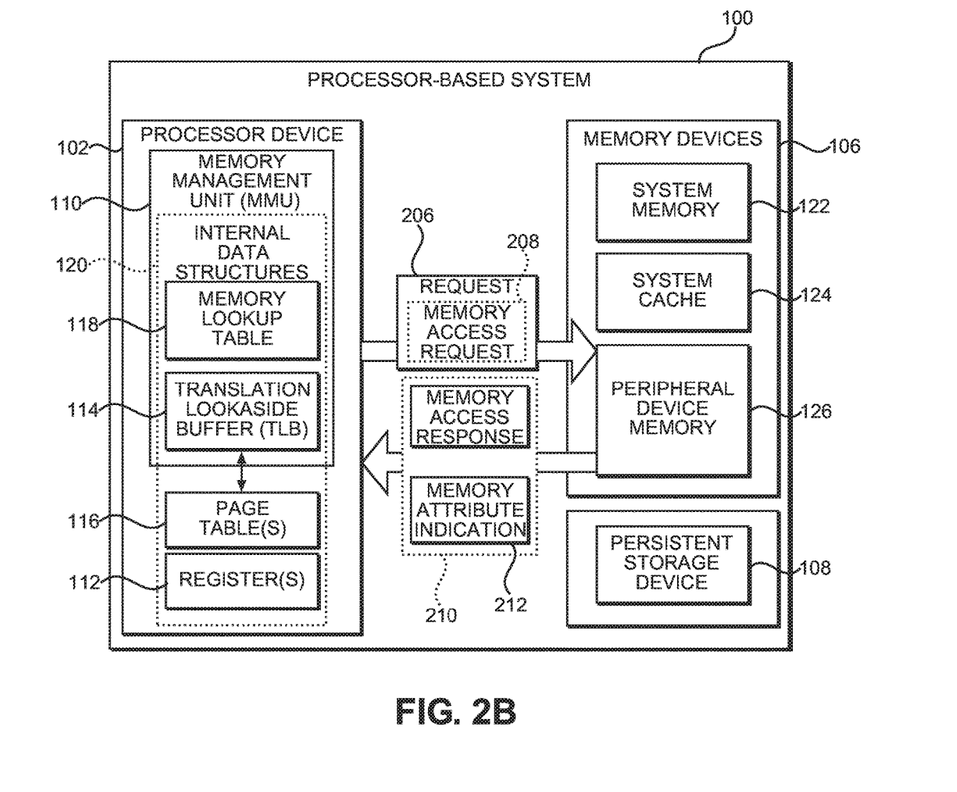
Figure 2C:
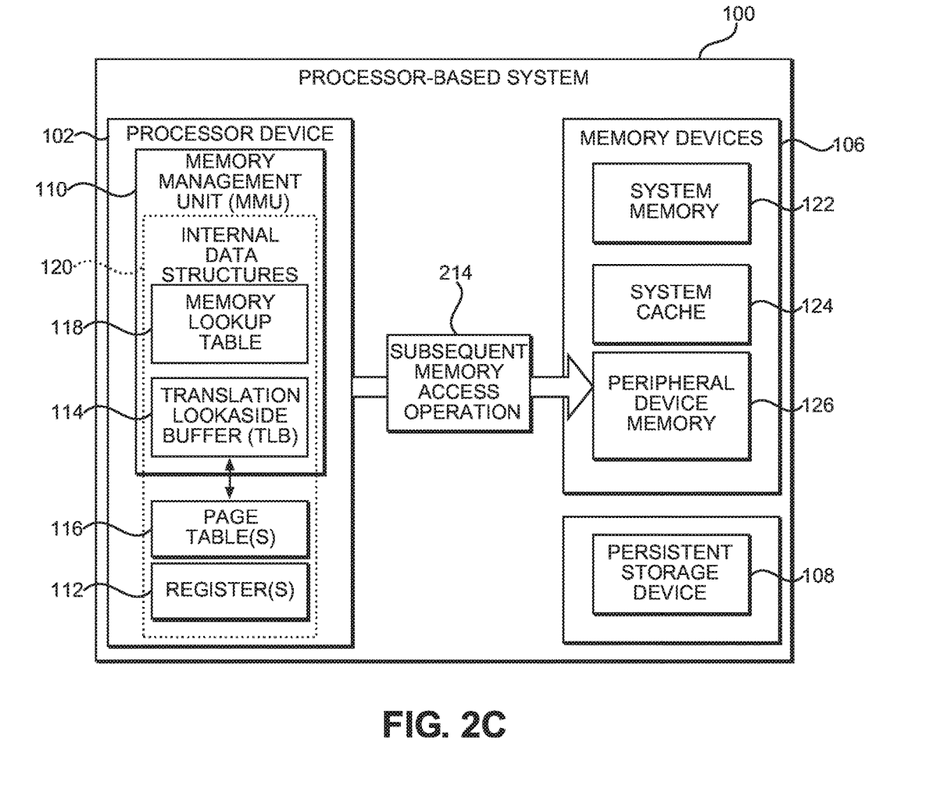

Some aspects may provide that the processor device 102 is configured to initially treat the memory devices 106 as having one or more default memory attributes (e.g., treating the memory devices 106 as device memory by default, as a non-limiting example). Subsequently, the memory devices 106 inform the processor device 102 of the corresponding memory attribute(s) in response to a first memory access request from the processor device 102. In this regard, FIG. 2B illustrates communications between the MMU 110 of the processor device 102 and the peripheral device memory 126, wherein the MMU 110 is configured to transmit a request 206 comprising a memory access request 208 (e.g., a memory read request or a memory write request) to the peripheral device memory 126. The peripheral device memory 126 then provides the MMU 110 with a memory access response 210 containing data or another type of result corresponding to the memory access type (not shown) responsive to the memory access request 208, and also including a memory attribute indication 212. The memory attribute indication 212 indicates one or more memory attributes associated with the peripheral device memory 126. As noted above with respect to FIG. 2A, the processor device 102 in FIG. 2B may store the memory attribute indication 212 for the peripheral device memory 126 for later reference. With reference to FIG. 2C, the processor device 102 may perform a subsequent memory access operation 214 based on a stored memory attribute indication, such as the memory attribute indication 204 or the memory attribute indication 212.

In some aspects, the memory attribute indication 204 in FIG. 2A and the memory attribute indication 212 in FIG. 2B provided by the memory devices 106 may also include a size (not shown) of the memory region associated with the one or more memory attributes. Alternatively or additionally, some aspects may provide that the memory attribute indications 204, 212 include a start address (not shown) and an end address (not shown) of a memory region associated with the one or more memory attributes. In this manner, each of the memory attribute indications 204, 212 may be used to define a range of well-behaved memory. Some aspects may provide that the memory attribute indications 204, 212 comprise a mask (not shown) indicating interleaved memory addresses within a specified memory region that are associated with the memory attribute(s).

Figure 3:
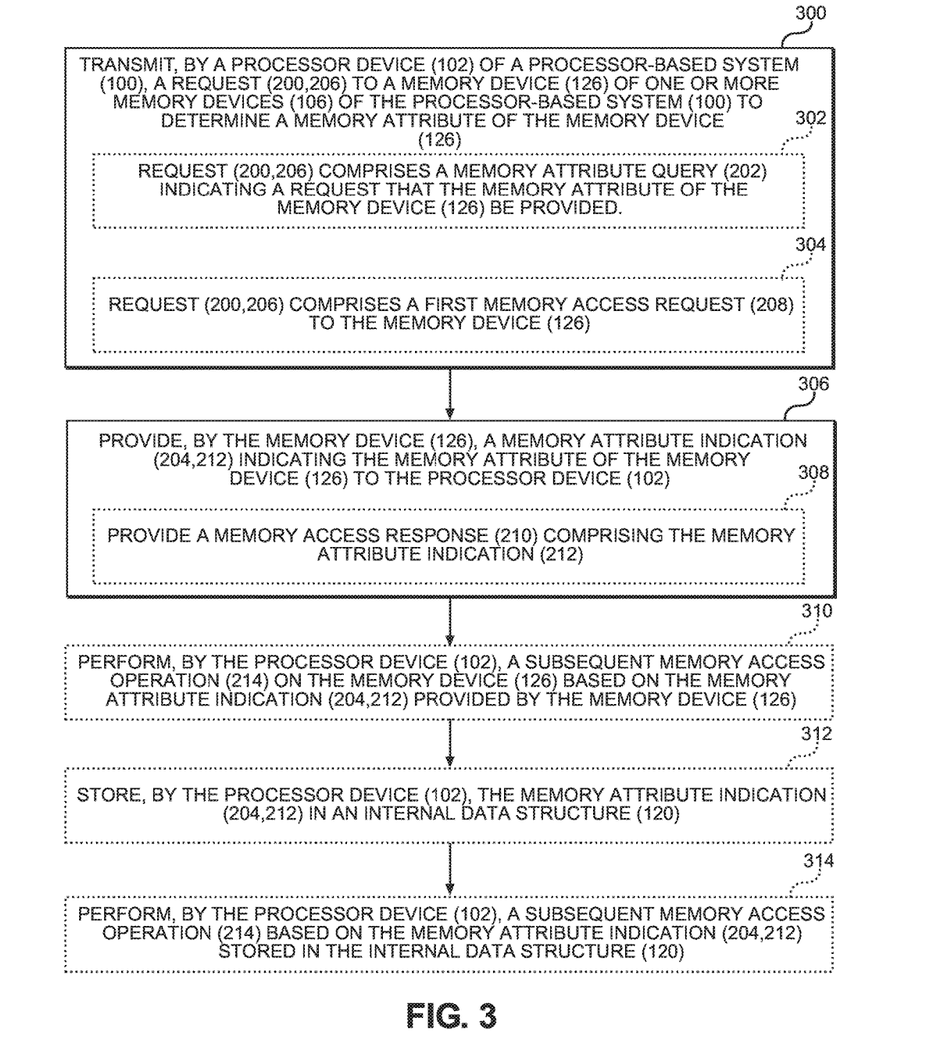
FIG. 3 is a flowchart illustrating an exemplary process for dynamically determining a memory attribute of a memory device using a memory attribute query.

To illustrate an exemplary process for dynamically determining a memory attribute of a memory device 126 using a memory attribute query 202 as shown in FIG. 2A, FIG. 3 is provided. In describing FIG. 3, elements of FIGS. 1 and 2A-2C are referenced for the sake of clarity. Operations in FIG. 3 begin with the processor device 102 transmitting a request 200, 206 to a memory device 126 of one or more memory devices 106 of the processor-based system 100 to determine a memory attribute of the memory device 126 (block 300). In some aspects, the request 200, 206 comprises a memory attribute query 202 indicating a request that the memory attribute of the memory device 126 be provided (block 302). Some aspects may provide that the request 200, 206 comprises a first memory access request 208 to the memory device 126 (block 304).

The memory device 126 next provides a memory attribute indication 204, 212 indicating the memory attribute of the memory device 126 to the processor device 102 (block 306). In some aspects, operations of block 306 for providing the memory attribute indication 204, 212 comprises providing a memory access response 210 comprising the memory attribute indication 212 (block 308). The processor device 102 according to some aspects then performs a subsequent memory access operation 214 on the memory device 126 based on the memory attribute indication 204, 212 provided by the memory device 126 (block 310). Some aspects may provide that the processor device 102 stores the memory attribute indication 204, 212 in an internal data structure 120 (block 312). The processor device 102 may then perform a subsequent memory access operation 214 based on the memory attribute indication 204, 212 stored in the internal data structure 120 (block 314).

Dynamically determining memory attributes in processor-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 4:
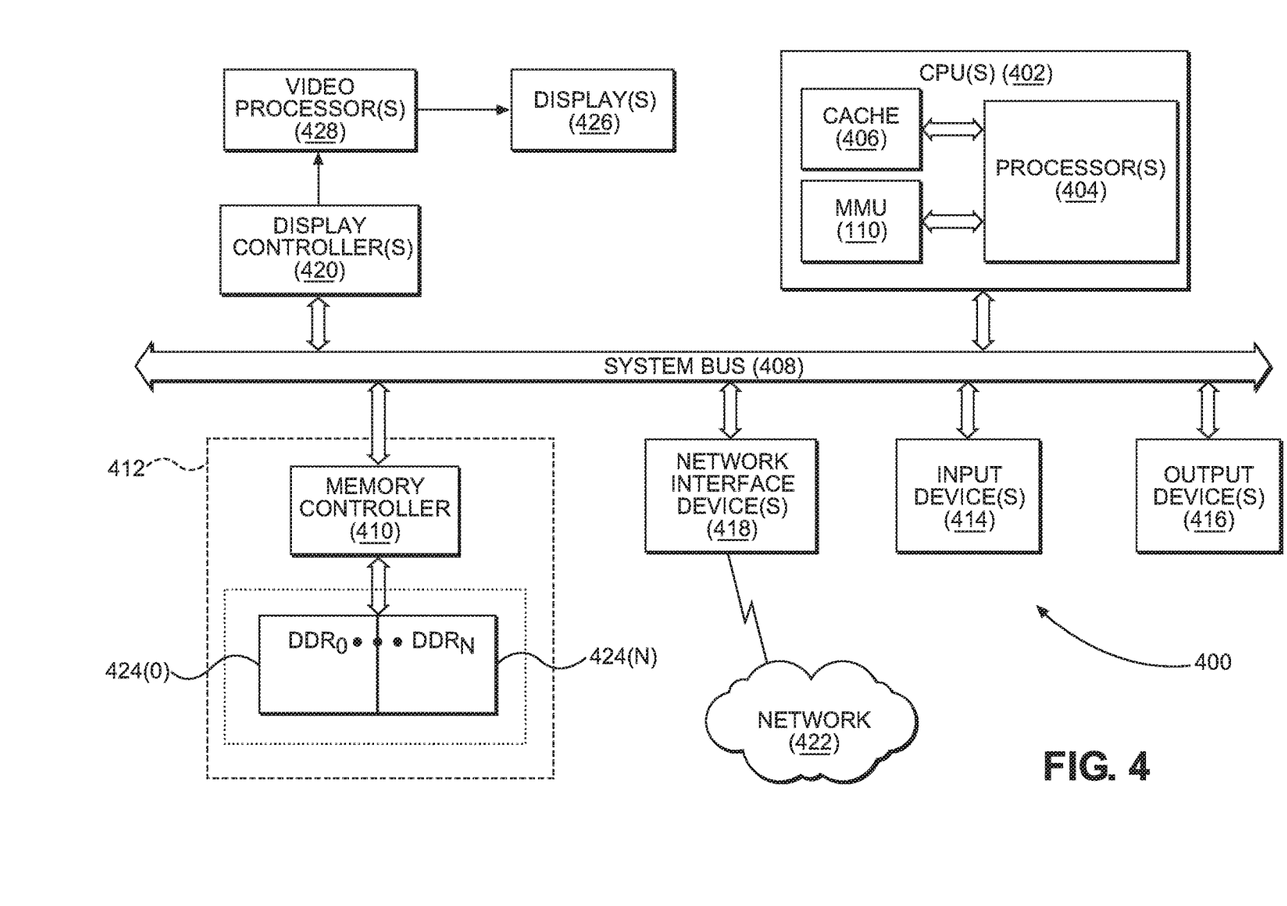
FIG. 4 is a block diagram of an exemplary processor-based system that can include the memory controllers and memory devices of FIGS. 2A-2C.

In this regard, FIG. 4 illustrates an example of a processor-based system 400 that can employ the processor device 102 illustrated in FIGS. 1 and 2A-2C. The processor-based system 400 includes one or more CPUs 402, each including one or more processors 404. The CPU(s) 402 may have cache memory 406 coupled to the processor(s) 404 for rapid access to temporarily stored data, and in some aspects may correspond to the processor device 102 of FIGS. 1 and 2A-2C and comprise the MMU 110 of FIGS. 1 and 2A-2C. The CPU(s) 402 is coupled to a system bus 408 and can intercouple master and slave devices included in the processor-based system 400. As is well known, the CPU(s) 402 communicates with these other devices by exchanging address, control, and data information over the system bus 408. For example, the CPU(s) 402 can communicate bus transaction requests to a memory controller 410 as an example of a slave device.

Other master and slave devices can be connected to the system bus 408. As illustrated in FIG. 4, these devices can include a memory system 412, one or more input devices 414, one or more output devices 416, one or more network interface devices 418, and one or more display controllers 420, as examples. The input device(s) 414 can include any type of input device, including but not limited to input keys, switches, voice processors, etc. The output device(s) 416 can include any type of output device, including, but not limited to, audio, video, other visual indicators, etc. The network interface device(s) 418 can be any devices configured to allow exchange of data to and from a network 422. The network 422 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 418 can be configured to support any type of communications protocol desired. The memory system 412 can include one or more memory units 424(0)-424(N).

The CPU(s) 402 may also be configured to access the display controller(s) 420 over the system bus 408 to control information sent to one or more displays 426. The display controller(s) 420 sends information to the display(s) 426 to be displayed via one or more video processors 428, which process the information to be displayed into a format suitable for the display(s) 426. The display(s) 426 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A processor-based system for providing dynamic determination of memory attributes, comprising:
  a processor device; and
  one or more memory devices each associated with a memory attribute of a plurality of memory attributes;
  the processor device configured to:
    transmit a request to a memory device of the one or more memory devices to determine a memory attribute of the memory device;
    receive, from the memory device, a memory attribute indication indicating the memory attribute of the memory device, wherein the memory attribute comprises an architectural memory type indicating one of a normal memory and a device memory; and perform a subsequent memory access operation on the memory device based on the memory attribute indication received from the memory device, wherein the processor device is configured to perform the subsequent memory access operation by being configured to:
  determine, based on the memory attribute indication, whether the memory comprises normal memory; and
  responsive to determining that the memory comprises normal memory, enable one or more of a speculative read operation and a cache operation on the memory.

2. The processor-based system of claim 1, wherein the processor device is configured to transmit the request by being configured to transmit a memory attribute query indicating a request that the memory attribute of the memory device be provided.

3. The processor-based system of claim 1, wherein the processor device is configured to:
  transmit the request by being configured to transmit a first memory access request to the memory device; and
  receive the memory attribute indication by being configured to receive a memory access response comprising the memory attribute indication.

4. The processor-based system of claim 1, wherein the memory attribute further comprises one of a memory persistence type, a memory attachment type, and a memory latency.

5. The processor-based system of claim 1, wherein the memory attribute indication comprises one or more of a size of a memory region associated with the memory attribute, a start address and an end address of a memory region associated with the memory attribute, and a mask indicating memory addresses associated with the memory attribute.

6. The processor-based system of claim 1, wherein the processor device is further configured to:
  store the memory attribute indication in an internal data structure; and
  perform a subsequent memory access operation based on the memory attribute indication stored in the internal data structure.

7. The processor-based system of claim 6, wherein the processor device is configured to store the memory attribute indication in the internal data structure by being configured to store the memory attribute indication in one of a translation lookaside buffer (TLB), a page table, a register, and a memory lookup table.

8. The processor-based system of claim 1 integrated into an integrated circuit (IC).

9. The processor-based system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A method for providing dynamic determination of memory attributes, comprising:
  transmitting, by a processor device of a processor-based system, a request to a memory device of one or more memory devices of the processor-based system to determine a memory attribute of the memory device;
  providing, by the memory device, a memory attribute indication indicating the memory attribute of the memory device to the processor device, wherein the memory attribute comprises an architectural memory type indicating one of a normal memory and a device memory; and
  performing a subsequent memory access operation on the memory device based on the memory attribute indication received from the memory device, wherein performing the subsequent memory access operation comprises:
    determining, based on the memory attribute indication, whether the memory comprises normal memory; and
    responsive to determining that the memory comprises normal memory, enabling one or more of a speculative read operation and a cache operation on the memory.

11. The method of claim 10, wherein the request comprises a memory attribute query indicating a request that the memory attribute of the memory device be provided.

12. The method of claim 10, wherein:
  the request comprises a first memory access request to the memory device; and
  providing the memory attribute indication comprises providing a memory access response comprising the memory attribute indication.

13. The method of claim 10, wherein the memory attribute further comprises one of a memory persistence type, a memory attachment type, and a memory latency.

14. The method of claim 10, wherein the memory attribute indication comprises one or more of a size of a memory region associated with the memory attribute, a start address and an end address of a memory region associated with the memory attribute, and a mask indicating interleaved memory addresses associated with the memory attribute.

15. The method of claim 10, further comprising:
  storing, by the processor device, the memory attribute indication in an internal data structure; and
  performing, by the processor device, a subsequent memory access operation based on the memory attribute indication stored in the internal data structure.

16. The method of claim 15, wherein the internal data structure comprises one of a translation lookaside buffer (TLB), a page table, a register, and a memory lookup table.

* * * * *